C. T. RIDGELY.
DEMOUNTABLE WHEEL.
APPLICATION FILED JUNE 7, 1915.
1,173,216.
Patented Feb. 29, 1916.
2 SHEETS—SHEET 1.
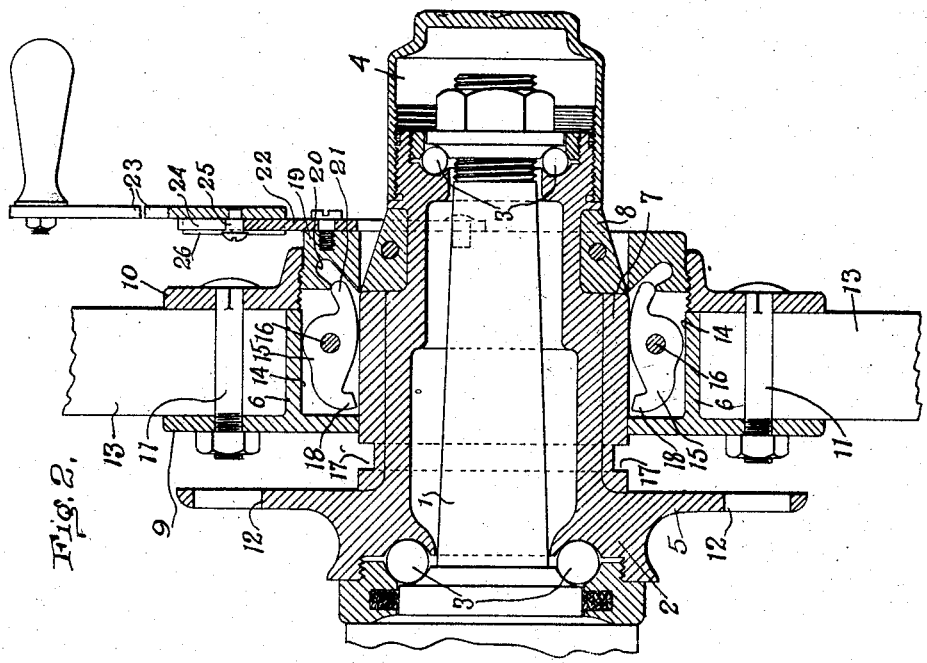
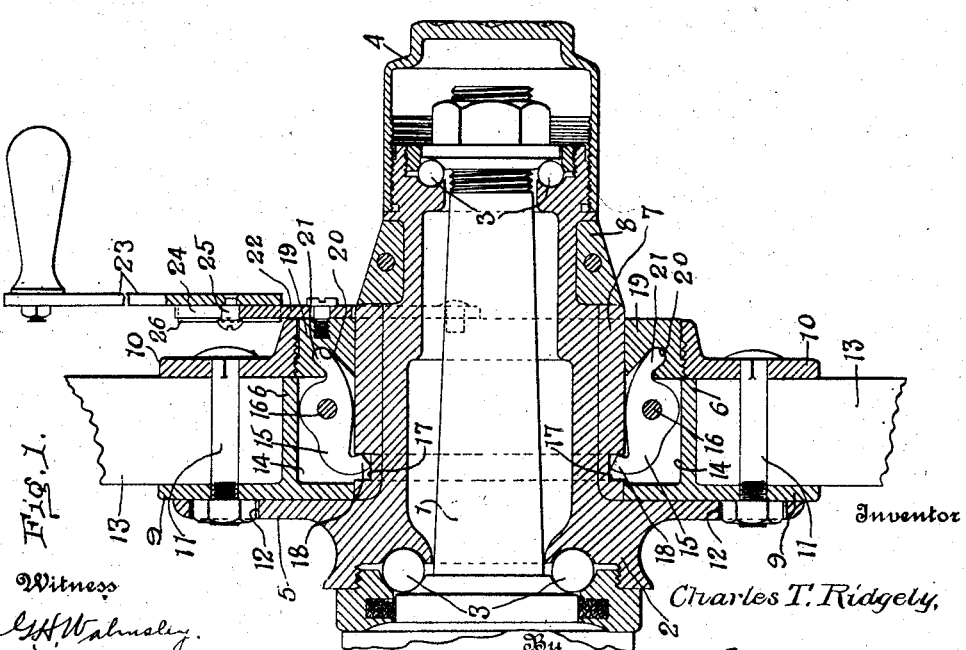
Inventor
Charles T. Ridgely, C. T. RIDGELY.
DEMOUNTABLE WHEEL.
APPLICATION FILED JUNE 7, 1915.
1,173,216.
Patented Feb. 29, 1916.
2 SHEETS—SHEET 2.
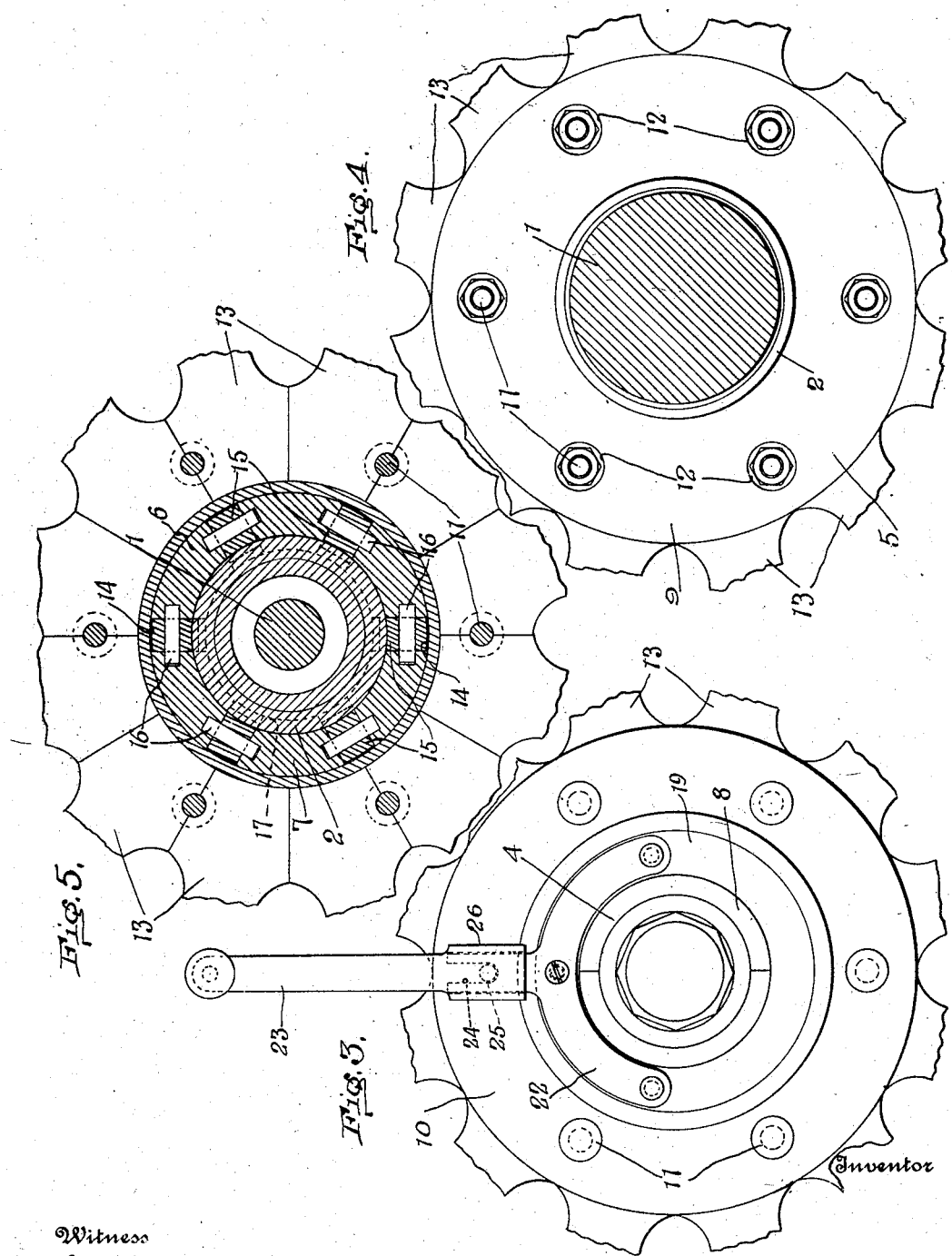
Witness
G. H. Walmsley.
Inventor
Charles T. Ridgely,
By
Toulmin Reed & Toulmin
Attorneys

UNITED STATES PATENT OFFICE.

CHARLES T. RIDGELY, OF SPRINGFIELD, OHIO.

DEMOUNTABLE WHEEL.

1,173,216.  Specification of Letters Patent.  Patented Feb. 29, 1916.

Application filed June 7, 1915. Serial No. 32,524.

*To all whom it may concern:*

Be it known that I, CHARLES T. RIDGELY, a citizen of the United States, residing at Springfield, in the county of Clark and State of Ohio, have invented certain new and useful Improvements in Demountable Wheels, of which the following is a specification, reference being had therein to the accompanying drawing.

This invention relates to demountable wheels and more particularly to that type of wheel in which the body of the wheel may be removed from the hub without disturbing the latter or exposing the interior or bearing surfaces thereof.

The object of the invention is to provide a wheel of this kind with means whereby the body of the wheel may be quickly and easily locked to or released from the hub, and in which this may be accomplished without the use of tools other than an operating handle.

To this end it is a further object of the invention to provide such a wheel with a plurality of locking devices which may be simultaneously actuated to move the same into or out of operative position by means of an actuating device arranged on the outer side of the wheel.

It is also an object of the invention to provide such a device which will be very simple in its construction, comprising but a few parts and having these parts of such a strong, durable character that they will not be liable to be broken or disarranged; and, further, to provide the device as a whole of such a character that it can be manufactured at a comparatively low cost.

In the accompanying drawings Figure 1 is a sectional view taken centrally through a wheel embodying my invention, showing the locking devices in their operative positions; Fig. 2 is a similar view showing the locking devices in their inoperative positions and the wheel partly removed from the main hub; Fig. 3 is an elevation of the outer side of the wheel; Fig. 4 is an elevation of the inner side of the wheel; and Fig. 5 is a sectional view taken transversely of the hub.

In these drawings I have illustrated one embodiment of my invention and have shown the same as applied to one of the wheels of a well known automobile, the wheel having wooden spokes, but it will be understood that this is chosen for the purpose of illustration only, and that the invention is applicable to wheels of various kinds and that the changes necessary to adapt the same to the differences in construction of the various wheels may be made without departing from the spirit of my invention.

As here shown, the wheel as a whole is mounted upon an axle 1 of ordinary construction, and comprises a main hub 2 rotatably mounted on the spindle of the axle, preferably provided with anti-friction bearings 3, and having its outer end closed by means of a cap 4. The hub 2 is of a well known kind and is provided near its inner end with a radial flange 5 to which, in the original wheel, the spokes were bolted. In applying my invention to this wheel I have removed the body of the wheel from the hub 2 and have provided the same with a supplemental hub 6 which fits snugly onto the central or body portion of the main hub and is movable axially of said main hub to permit it to be placed on and removed from the same. In the present instance, the central portion of the main hub is enlarged by means of a sleeve 7, which is rigidly secured thereto and when in place forms a part of the main hub. This sleeve is used merely to increase the diameter of the main hub so that the supplemental hub may be made of a size which will enable it to be readily passed over the hub cap 4. In other types of wheels this sleeve would be omitted, or, in the present type of wheel if the invention was embodied in the wheel when it was originally built the hub would be thickened without the use of a sleeve. The sleeve may be rigidly secured to the hub in any suitable manner. As here shown, it is retained in place by means of a two-part collar 8 which is mounted upon the hub between the outer end of the sleeve and the flanged end of the hub. The supplemental hub comprises two parts having radial flanges 9 and 10, between which the spokes 13 are clamped by means of bolts 11. The nuts on the inner end of the bolts are arranged in openings in the flange 5 of the main hub to resist any tendency of the supplemental hub to rotate upon the main hub. In the present construction the bolt holes with which the flange 5 was originally provided have been enlarged, as shown at 12, to receive the nuts. Thus, when the supplemental hub is placed in position upon the main hub the nuts will enter the respective openings, as shown in Fig. 1, and will lock the two hubs against relative rotation.

To firmly secure the supplemental hub in position upon the main hub I have provided one of the hubs, in the present instance the supplemental hub, with a plurality of locking devices or dogs which are movable into and out of operative engagement with a part of the other hub, and I have provided a device by means of which these dogs may be simultaneously actuated to move them into or out of their locking positions. In that construction here illustrated the supplemental hub 6 is provided with a series of axial recesses 14, in each of which is mounted a locking member or dog 15 which is pivoted on an axis extending transversely to the hub, as shown at 16. The main hub has a shoulder to coöperate with each of the locking dogs 15 and this shoulder is preferably formed by providing the enlarged portion of the supplemental hub with an annular groove 17 arranged near the inner end thereof and in the paths of projections or noses 18 on the locking devices or dogs as they are moved in one direction. It will be obvious that when the projections of the locking devices lie in the groove 17 the supplemental hub is held against axial movement relative to the main hub. The dogs are of a relatively large construction and are mounted snugly between the side walls of the respective recesses, thus reducing the strain on the pivot pins to a minimum and rendering the construction as a whole a very powerful one, and one which is not liable to be injured even by the most severe strains to which it may be subjected.

To actuate the several locking devices simultaneously, I have provided the supplemental hub with an actuating device which is here shown in the form of a collar 19 rotatably mounted in the outer end of the hub and preferably screw-threaded therein so that its rotation will impart axial movement thereto. This collar has in its inner end an annular groove 20 adapted to receive a projection or tail 21 extending outwardly from each of the locking devices. This groove has both of its side walls inclined, so that the axial movement of the collar will cause one or the other of the inclined walls thereof, depending upon the direction of movement of the collar, to act upon the projections or tails 21 of the locking dogs and rock the several dogs about their axes. Rotatory movement may be imparted to the collar in any suitable manner, as by means of a spanner wrench, but I prefer that the actuating device should be permanently secured to the collar and I have, therefore, rigidly secured to the collar a device 22 which is similar in construction to a spanner wrench and is adapted to be connected with an actuating handle 23. This actuating handle is preferably detachable from the device 22 and to this end the latter is slotted, as shown at 24, to receive a stud 25 carried by the handle 23, and the handle 23 has lips 26 adapted to extend upon the opposite sides of the device 22, thus forming a very strong connection between the handle and the actuating device, but a connection which can be readily separated when it is desired to remove the handle.

The operation of the device will be readily understood from the foregoing description, and it will be apparent that to remove the body of the wheel from the hub and substitute a new body therefor, it is only necessary to attach the operating handle 23 to the actuating device and impart rotatory movement thereto, in practice about two complete rotations are required, and this rotatory movement will cause the cam groove in the collar to move the dogs into their inoperative positions, thereby releasing the supplemental hub from the main hub and permitting the former to be withdrawn. When the body of the wheel, either the one that was removed or a substitute therefor, is replaced upon the hub it is moved into engagement with the flange 5, which limits its inward movement, and rotatory movement is again imparted to the actuating device, thereby moving the dogs into their locking positions and firmly securing the supplemental hub in position upon the main hub. The noses of the several dogs snugly engage the forward side wall of the groove 17, and, inasmuch as the supplemental hub bears against the flange 5, of the main hub, it will be apparent that there is no lost motion between the two hubs but that they are rigidly secured one to the other. The interlocking connection between the supplemental hub and the main hub, which is provided by the bolts 11 and the holes in the flange 5, effectually prevents any relative rotatory movement of these parts. Consequently, the construction as a whole is exceedingly rigid and very powerful. The device is very simple in its construction, has a small number of parts, and has these parts of such a character that they can be manufactured at a comparatively low cost. Further, the device is exceedingly simple in its operation, and the operation is of such a character that it is practically impossible to fail to rigidly connect the two hubs, because the actuating device is movable in one direction only. Further, the device is of such a character that it can be embodied either in new wheels at the factory or it can be readily built into old wheels, utilizing the original hubs, spokes, rims, etc., and adding thereto the supplemental hub and locking devices.

While I have shown and described one embodiment of my invention, I wish it to be understood that I do not desire to be limited to the details of construction shown and described, for obvious modifications will occur to one skilled in the art.

Having thus fully described my invention, what I claim as new and desire to protect by Letters Patent, is:

1. In a wheel, a main hub, a supplemental hub, a locking device carried by one of said hubs and movable into and out of locking engagement with the other hub, and an axially movable actuating device comprising means to positively move said locking device into and out of its locking position.

2. In a wheel, a main hub, a supplemental hub, a locking device carried by one of said hubs and movable into and out of locking engagement with the other hub, and an axially movable actuating device comprising means to engage opposite portions of said locking device to positively move the same into and out of its locking position.

3. In a wheel, a main hub, a supplemental hub, one of said hubs having a shoulder, locking devices pivotally mounted on the other of said hubs and having parts movable into and out of engagement with said shoulder, and an actuating device having cam surfaces to move said locking devices into and out of their locking positions.

4. In a wheel, a main hub, a supplemental hub, one of said hubs having a shoulder, locking devices pivotally mounted on the other of said hubs and having parts movable into and out of engagement with said shoulder, and a rotary actuating device having cam surfaces to move said locking devices into and out of their locking positions.

5. In a wheel, a main hub, a supplemental hub, one of said hubs having a shoulder, locking devices pivotally mounted on the other of said hubs and having parts movable into and out of engagement with said shoulder, and a longitudinally movable actuating device having cam surfaces to move said locking devices into and out of their locking positions.

6. In a wheel, a main hub, a supplemental hub, one of said hubs having a shoulder, locking devices pivotally mounted on the other of said hubs and having parts movable into and out of engagement with said shoulder, and an actuating device comprising means to move said locking devices into and out of their locking position.

7. In a wheel, a main hub, a supplemental hub, one of said hubs having a circumferential shoulder and the other of said hubs having a circumferential series of recesses, locking devices mounted in the respective recesses and having parts movable into and out of locking position relatively to the shoulder of the first-mentioned hub, and an actuating device having movement in one direction to cause said locking devices to be moved into locking relation to said shoulder and having movement in another direction to positively move said locking devices out of operative relation to said shoulder.

8. In a wheel, a main hub, having a circumferential shoulder, a supplemental hub having a series of recesses, locking devices mounted in said recesses and having parts movable into and out of locking positions relatively to said shoulder, and an actuating device rotatably mounted on said supplemental hub and operatively connected with said locking devices to positively move them into and out of their operative positions.

9. In a wheel, a main hub having a shoulder, a supplemental hub, a locking dog pivotally mounted on said supplemental hub and having a part movable into and of engagement with said shoulder, an actuating device mounted on said supplemental hub for axial movement, said actuating device having a cam-shaped recess therein, and said locking device having a part adapted to enter said recess, whereby the axial movement of said actuating device will move said locking dog about its axis.

10. In a wheel, a main hub having a shoulder, a supplemental hub, a locking dog pivotally mounted on said supplemental hub, an actuating device rotatably mounted on said supplemental hub and having an annular recess provided with cam-shaped portions, and said locking dog having a projection adapted to enter said recess and to be engaged by one or the other of said cam-shaped portions when rotary movement is imparted to said actuating device.

11. In a wheel, a main hub having a shoulder, a supplemental hub, a locking dog pivotally mounted on said supplemental hub and having a part movable into and out of engagement with said shoulder, an actuating device rotatably mounted on said supplemental hub and having cam-shaped portions so arranged that when said actuating device is moved in one direction one of said cam-shaped portions will engage said dog and actuate the same and when said actuating device is moved in the opposite direction another of said portions will engage said dog and actuate the same.

12. In a wheel, a main hub having a shoulder, a supplemental hub, a locking dog pivotally mounted on said supplemental hub and having a part movable into and out of engagement with said shoulder, an actuating device screw-threaded into said supplemental hub and having an annular groove in its inner end, said groove having inclined walls, said locking dog having a part extending into said annular groove and arranged to be engaged by said inclined walls, and means for rotating said actuating device to impart axial movement thereto and actuate said dog.

13. In a wheel, a main hub having a circumferential shoulder, a supplemental hub, a plurality of locking dogs pivotally mounted on said supplemental hub and having parts adapted to be moved into and out of operative engagement with said shoulder, a collar screw-threaded into said supplemental hub and having an annular groove in the inner face thereof, said groove having its side walls inclined and said locking dogs having parts extending into said annular groove, and means for rotating said collar, whereby axial movement is imparted thereto, and one of the inclined walls of said groove is caused to impart movement to said locking dogs.

14. In a wheel, a main hub having a circumferential shoulder, a supplemental hub, a plurality of locking dogs pivotally mounted on said supplemental hub and having parts adapted to be moved into and out of operative engagement with said shoulder, a collar screw-threaded into said supplemental hub and having an annular groove in the inner face thereof; said groove having its side walls inclined and said locking dogs having parts extending into said annular groove, means for rotating said collar, whereby axial movement is imparted thereto, and one of the inclined walls of said groove is caused to impart movement to said locking dogs, and an operating handle detachably secured to said collar.

15. In a wheel, a main hub having a shoulder, a supplemental hub, a locking dog pivotally mounted on said supplemental hub and having a part movable into and out of engagement with said shoulder, an actuating device rotatably mounted on said supplemental hub and having a cam-shaped portion, said locking dog having opposed surfaces adapted to engage said cam-shaped portion, and means arranged exteriorly of said hubs for operating said rotatable actuating device.

16. In a wheel, a main hub, a supplemental hub removably mounted on said main hub, one of said hubs having a shoulder, a locking device mounted on the other of said hubs and movable into and out of engagement with said shoulder, an actuating device having parts to operatively engage different portions of said locking device to move the latter into and out of operative relation with said shoulder.

17. In a wheel, a main hub, a supplemental hub removably mounted on said main hub, one of said hubs having a shoulder, a locking device mounted on the other of said hubs and movable into and out of engagement with said shoulder, an actuating device rotatably mounted on one of said hubs and having parts to operatively engage different portions of said locking device to move the latter into and out of operative relation with said shoulder.

18. In a wheel, a main hub, a supplemental hub removably mounted on said main hub, one of said hubs having a shoulder, a locking device mounted on the other of said hubs and having a part movable into and out of locking relation with said shoulder, a rotatable actuating device having two circumferential parts, each of said parts having a cam surface and said cam surfaces being so arranged that when said actuating device is rotated in one direction the cam surface of one part will engage said locking device and move the latter into its locking position and when said actuating device is rotated in the other direction the cam surface of the other part thereof will engage said locking device and move the latter into its inoperative position.

In testimony whereof, I affix my signature in presence of two witnesses.

CHARLES T. RIDGELY.

Witnesses:
 OLIN F. ROAHEN,
 W. R. CORRY.